United States Patent [19]

Taylor et al.

[11] 4,101,720
[45] Jul. 18, 1978

[54] DEGRADABLE PLASTIC

[75] Inventors: Lynn J. Taylor, Toledo; John W. Tobias, Perrysburg, both of Ohio

[73] Assignee: Owens-Illinois, Inc., Toledo, Ohio

[21] Appl. No.: 646,097

[22] Filed: Jan. 2, 1976

Related U.S. Application Data

[63] Continuation-in-part of Ser. No. 230,969, Mar. 1, 1972.

[51] Int. Cl.$^2$ .......................... C08K 3/32; C08K 3/38
[52] U.S. Cl. ...................... 526/3; 260/23 H; 260/DIG. 43; 526/1; 526/4; 526/6
[58] Field of Search ............... 260/DIG. 43, 23 H; 526/4, 3, 6, 1

[56] References Cited

U.S. PATENT DOCUMENTS

| | | | |
|---|---|---|---|
| 3,341,357 | 9/1967 | Feild | 260/DIG. 43 |
| 3,575,904 | 4/1971 | Clarke | 260/23 AR |
| 3,592,792 | 7/1971 | Newland et al. | 260/DIG. 43 |
| 3,673,134 | 6/1972 | Anderson | 260/DIG. 43 |
| 3,825,627 | 7/1974 | McGaugh | 260/DIG. 43 |
| 3,840,512 | 10/1974 | Brackman | 260/DIG. 43 |
| 3,935,141 | 1/1976 | Potts et al. | 260/DIG. 43 |

OTHER PUBLICATIONS

"Polyethylene," by Raff et al., p. 99, Interscience Publ., N.Y., 1956.
"Autoxidation and Antioxidants," by Lundberg, vols. I & II, Interscience Publ., N.Y., 1964, pp. 108 and 919-924.
"Mechanisms of Oxidation of Organic Compounds," by Waters, John Wiley & Sons, N.Y., 1964, pp. 13-14.

*Primary Examiner*—Eugene C. Rzucidlo
*Attorney, Agent, or Firm*—Edward J. Holler; M. E. Click; D. H. Wilson, Jr.

[57] ABSTRACT

There is disclosed a novel degradable plastic composition consisting of an organic polymeric material, said material having dispersed therein at least one organic derivative of a transition metal and at least one readily autoxidizable organic material.

46 Claims, No Drawings

DEGRADABLE PLASTIC

RELATED APPLICATION

This is a continuation-in-part of copending U.S. Pat. Application Ser. No. 230,969, filed Mar. 1, 1972.

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One means suggested for combating the plastic waste disposal problem has been the use of plastic compositions which degrade upon exposure to ultraviolet light. For example, reference is made to British Patent Specification No. 1,128,793, which describes ethylene-carbon monoxide copolymers which undergo rapid deterioration when subjected to natural sunlight or artificial sources of untraviolet radiation.

The suggested use of ultraviolet-degradable polymeric compositions for packaging applications is attractive, in the sense that materials exposed to sunlight, such as roadside litter, will undergo accelerated environmental deterioration. However, the deterioration of such materials will not necessarily be rapid if they are not exposed to sunlight, as, for example, in the case of waste materials which are buried or covered by other materials in the course of waste disposal.

An alternative approach involves the use of oxygen, rather than sunlight, as the primary initiator of polymer degradation.

The enhancement of the rate of environmental deterioration of plastics through the use of oxidation-promoting additives in known in the prior art. For example, the preparation of degradable polyolefin films containing certain organic derivatives of transition metals is described in U.S. Letters Pat. No. 3,454,510.

In accordance with the practice of the present invention the effectiveness of an organic derivative of a transition metal is enhanced by the incorporation of a second additive comprising an organic material which readily undergoes reaction with gaseous oxygen.

DESCRIPTION OF THE INVENTION

In accordance with this invention, a degradable plastic composition is prepared by the admixture of an organic polymer and a multi-component additive system, said additive system comprising at least one organic derivative of a transition metal and at least one readily autoxidizable organic material.

Typical organic polymers (and copolymers) contemplated especially include polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(caprolactam), poly(hexamethyleneadipamide), poly(ethylene terephthalate), vinyl chloride-vinyl acetate copolymers, styrene-butadiene copolymers, styrene-isoprene copolymers, cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The term "transition metal" as used herein, should be understood to include elements 21 through 30, 39 through 48, 57 through 80 and 89 through 103 of the Periodic Table. In chemical terms, these are elements having a partially filled inner shell of electrons. Preferred transition metals are cobalt, chromium, copper, iron, manganese, and nickel.

The phrase "organic derivative", when applied to the transition-metal-containing component of the additive, should be understood to include all compounds and mixtures thereof, having a structure which contains at least one transition-metal atom and at least one organic group.

Specific organic derivatives of transition metals, which may be employed in the practice of this invention, include naphthenates, octoates, tallates, resinates, 3,5,5-trimethylhexoates, neodecanoates, acetates, butyrates, valerates, cyclohexanebutyrates, acetylacetonates, benzoylacetonates, dodecylacetylacetonates, benzoates, oxalates, citrates, tartrates, dialkyldithiocarbamates, disalicylalethylenediamine chelates, and phythalocyanines, all derived from the following elements: cobalt, chromium, copper, iron, nickel and manganese. The metal may be in any valence state for which the corresponding organic derivative is obtainable: for example, cobalt may be present in the cobaltous or cobaltic state, copper in the cuprous or cupric state, and iron in the ferrous or ferric state.

The phrase "readily autoxidizable organic material," as used herein, may be defined as a material which reacts with gaseous oxygen at a reaction rate more rapid than the corresponding reaction, under comparable conditions, of gaseous oxygen with an equal weight of the additive-free polymer into which the "readily autoxidizable material" is to be combined. Such reaction rates may be compared by the volumetric measurement of the rate of absorption of gaseous oxygen by separate pure samples of the additive and the polymer, under conditions of constant temperature and constant oxygen pressure. In general, readily oxidizable organic materials will be those whose structure contains at least one carbon-hydrogen bond which is activated, with respect to hydrogen-atom abstraction, by an adjacent multiply bonded atom and/or by an adjacent heteroatom, such as oxygen or nitrogen. Typical examples include olefinic compounds, ethers, acetals, ketals, amines, substituted aromatic compounds, aldehydes, organic sulfur compounds, organic boron compounds, organic phosphorus compounds, natural oils, and natural and synthetic resins of low molecular weight.

Specific examples of such readily oxidizable organic materials include the following:

Olefinic Materials:

1-octadecene; 1-hexadecene; 1-docosene; isobutylene trimer and tetramer; dicyclopentadiene; myrcene; ocimene; farnesene; phellandrene; lycopene; squalene; digeranyl; carotenes; limonene; α-pinene; β-pinene.

Ethers, Acetals, Ketals, etc:

Dibenzyl ether; bis(α-methylbenzyl)ether; p-allylanisole; polyethylene glycol and derivatives; polypropylene glycol and derivatives; poly(tetrahydrofuran) and derivatives; α-amyl cinnamaldehyde dimethyl acetal; citral dimethyl acetal; dihydro-safrole; hydratropic aldehyde dimethyl acetal; isosafrole; methyl eugenol; safrole; phenylacetaldehyde diethyl acetal; 2,2-diallyloxypropane; pentaerythritol diformal; p-dibenzyloxy benzene; 1,1,2,2-tetra allyloxy ethane; 1,1,3,3-tetra allyloxy propane.

Amines

Benzyldimethyl amine; N,N-dibenzylaniline; n-decylamine; 4,4'-methylenebis-(N,N-dimethylaniline); oleylamine; linoleylamine; spermine.

Substituted Aromatic Hydrocarbons

Indene and substituted indenes; tetralin and derivatives; fluorene and substituted fluorenes; 9,9'-bifluorene; bibenzyl; 1,2-dihydronaphthalene, 1,3,5-triisopropylbenzene; 1,2,4,5-tetraisopropylbenzene; 9,10-dihydroanthracene; diphenylmethane; phenylcyclohexane; xanthene; n-dodecylbenzene; alkyl naphthalenes; allyl benzene; divinylbenzene; methallylbenzene; cumene; allyl and methallyl derivatives of naphthalene, anthracene, etc.

Aldehydes

Heliotropin; 3-benzyloxybenzaldehyde; 4-benzyloxylbenzaldehyde; p-n-octyloxybenzaldehyde; decanal; 10-undecenal; dodecanal; 2-methylundecanal; n-tetradecanal; α-amylcinnamaldehyde; cinnamaldehyde; citral; citronellal; p-isopropylbenzaldehyde; p-isopropyl-alpha-methylhydrocinnamaldehyde; α-n-hexylcinnamaldehyde; salicyladehyde.

Organic Sulfur Compounds

Benzyl mercaptan; 1-dodecanethiol; 2-mercaptobenzimidazole; 1-decanethiol; benzenethiol; p-toluenethiol; 1-octadecanethiol; p-methoxybenzenethiol; 2-mercaptobenzothiazole; dibenzyl sulfide; dibenzyl disulfide; dilauryl sulfide; dilauryl disulfide; benzenesulfinic acid; p-toluenesulfinic acid.

Boron Compounds

Tri-n-hexylborane; tri-n-octylborane; triisobutyl borane.

Organic Phosphorus Compounds

Tribenzyl phosphite; dibenzyl phosphite; trilauryl phosphite; trilauryl phosphine; triphenyl phosphine; tribenzyl phosphine.

Natural Oils

Castor oil; fish oil; linseed oil; tall oil; soya oil; tung oil; safflower oil; oiticica oil.

Natural and Synthetic Resins

Rosin; limed rosin; ester gum; rosin acids; rosin esters; terpene resins; coumarone-indene resins; alkyd resins; dicyclopentadiene-derived resins; furan resins; polymers and copolymers of butadiene; polymers and copolymers of isoprene; unsaturated polyester resins.

The following organic compounds may also be considered "readily autoxidizable organic materials" within the scope of the present invention:

Abietic acid and esters derived therefrom; farnesol and esters derived therefrom; geraniol and esters derived therefrom; linalool and esters derived therefrom; citronellol and esters derived therefrom; benzyl alcohol and esters derived therefrom; anthrone; anthranol; benzhydrol; benzoin; hydrobenzoin; dihydrocoumarin; behenone; laurone; stearone; α-ionone; β-ionone; triallyl orthoformate.

The novel plastic compositions of this invention can be prepared by a number of methods. A preferred method consists essentially of heating the polymer at a temperature below its decomposition temperature, incorporating the additive mixture, and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the additives and molding or extruding the resulting mixture. Processing conditions, such as temperature, time, and pressure, will be obvious to those skilled in the art.

Another preferred process for preparing the novel plastic compositions of this invention consists essentially of blending the additives with a solid degradable polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additives. The resulting melt can be extruded or molded and cooled to form a solid extrudate or molded article.

The novel plastic compositions of this invention can be prepared at the time of disposal of conventional plastic articles. For example, a plastic article can be crushed, milled or ground, and subsequently or simultaneously mixed with the additives.

A preferred process for preparing the novel plastic compositions of this invention consists essentially of casting a film from a composition of the additives and a polymer in an inert solvent. By "inert solvent" is meant that the solvent does not react with the polymer or additives. Use of this method is particularly attractive for preparing degradable coating or adhesive materials.

The additive composition can also be applied as a solution, slurry, or paste to the surface of a plastic article. The coating composition can be applied by brushing, roller coating, spraying, dipping or printing (i.e. uniformly or image-wise) on the surface of the article, in the presence or absence of a solvent.

A composite film, sheet, or extruded or molded article can also be prepared such that one or both types of additives are present in a layer adjacent to the layer containing the organic polymer.

The novel degradable plastic compositions can also contain non-reactive additives. By the term "non-reactive additive(s)" is meant a chemical additive, filler, or reinforcement commonly used in the formulation of plastic compositions which does not materially interfere with the degradation process.

For example, the compositions of this invention can contain additives and processing aids, viscosity depressants, mold-release agents, emulsifiers, and slip agents. The composition of this invention can also contain antioxidants, anti-static agents, and fibrous reinforcements which do not materially detract from the eventual degradation of the composition. The compositions of this invention can also contain fillers, such as barium sulphate, calcium carbonate, calcium silicate, fumed colloidal silica, glass, and clay.

Flame retardants, lubricants, plasticizers, adhesion promoters and stabilizers, such as those used to prevent thermo-oxidative decomposition can also be used. In some case, it may be necessary to add an antioxidant or stabilizer to permit high-temperature processing, even though such additive may slow the degradation process. In other cases, it may be desirable to retard degradation for a limited period of time.

It is contemplated that the degradable plastic compositions of this invention will ordinarily contain about 70 to 99% by weight of the organic polymer, about 0.01 to 10% of the organic derivative of a transition metal, and about 1 to 25% of the readily autoxidizable organic material, such percentages being exclusive of any non-reactive additives.

While a primary object of this invention is to provide degradable plastic compositions which do not require sunlight in order to undergo degradation, it should be understood that such compositions will also degrade readily in the presence of sunlight. In fact, sunlight will often accelerate the degradation process, particularly in those cases in which one or more of the degradation promoting additives absorb solar radiation.

We claim:

1. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an acetal compound selected from the group consisting of α-amyl cinnamaldehyde dimethyl acetal; citral dimethyl acetal; hydratropic aldehyde dimethyl acetal; and phenylacetaldehyde diethyl acetal.

2. The composition of claim 1 wherein said plastic composition comprises about 70 to 99 percent by weight of said polymer, about 0.01 to 10 percent by weight of said transition-metal derivative and about 1 to 25 percent by weight of said readily autoxidizable organic material.

3. The composition of claim 1 wherein the transition-metal is selected from one or more of the elements 21 through 30, 39 through 48, 57 through 80 and 89 through 103 of the Periodic Table.

4. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an amine compound.

5. The composition of claim 4 wherein said amine compound is selected from the group consisting of benzyldimethyl amine; N,N-dibenzylaniline; n-decylamine; 4,4'-methylenebis(N,N-dimethylaniline); oleylamine; linoleylamine; and spermine.

6. The composition of claim 4 wherein said plastic composition comprises about 70 to 99 percent by weight of said polymer, about 0.01 to 10 percent by weight of said transition-metal derivative and about 1 to 25 percent by weight of said readily autoxidizable organic material.

7. The composition of claim 4 wherein the transition-metal is selected from one or more of the elements 21 through 30, 39 through 48, 57 through 80 and 89 through 103 of the Periodic Table.

8. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an aldehyde compound.

9. The composition of claim 8 wherein said aldehyde compound is selected from the group consisting of heliotropin; 3-benzyloxybenzaldehyde; 4-benzyloxybenzaldehyde; p-n-octyloxybenzaldehyde; decanal; 10-undecenal; dodecanal; 2-methylundecanal; n-tetradecanal; α-amylcinnamaldehyde; cinnamaldehyde; citral; citronellal; p-isopropylbenzaldehyde; p-isopropyl-alpha-methylhydrocinnamaldehyde; α-n-hexylcinnamaldehyde; and salicylaldehyde.

10. The composition of claim 8 wherein said plastic composition comprises about 70 to 99 percent by weight of said polymer, about 0.01 to 10 percent by weight of said transition-metal derivative and about 1 to 25 percent by weight of said readily autoxidizable organic material.

11. The composition of claim 8 wherein the transition-metal is selected from one or more of the elements 21 through 30, 39 through 48, 57 through 80 and 89 through 103 of the Periodic Table.

12. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic sulfur compound.

13. The composition of claim 12 wherein said organic sulfur compound is selected from the group consisting of benzyl mercaptan; 1-dodecanethiol; 2-mercaptobenzimidazole; 1-decanethiol; benzenethiol; p-toluenethiol; 1-octadecanethiol; p-methoxybenzenethiol; 2-mercaptobenzothiazole; dibenzyl sulfide; dibenzyl disulfide; dilauryl sulfide; dilauryl disulfide; benzenesulfinic acid; and p-toluenesulfinic acid.

14. The composition of claim 12 wherein said plastic composition comprises about 70 to 99 percent by weight of said polymer, about 0.01 to 10 percent by weight of said transition-metal derivative and about 1 to 25 percent by weight of said readily autoxidizable organic material.

15. The composition of claim 12 wherein the transition-metal is selected from one or more of the elements 21 through 30, 39 through 48, 57 through 80 and 89 through 103 of the Periodic Table.

16. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic borane compound.

17. The composition of claim 16 wherein said organic boron compound is selected from the group consisting of tri-n-hexylborane; tri-n-octylborane; and triisobutylborane.

18. The composition of claim 16 wherein said plastic composition comprises about 70 to 99 percent by weight of said polymer, about 0.01 to 10 percent by weight of said transition-metal derivative and about 1 to 25 percent by weight of said readily autoxidizable organic material.

19. The composition of claim 16 wherein the transition-metal is selected from one or more of the elements 21 through 30, 39 through 48, 57 through 80 and 89 through 103 of the Periodic Table.

20. As a composition of matter, a plastic composition which is degradable in the absence of electromagnetic radiation and consists essentially of an organic polymer having dispersed therein at least one transition-metal derivative and at least one readily autoxidizable organic material, said transition-metal derivative and readily autoxidizable organic material both being present in an amount sufficient to cause degradation of said polymer in the absence of electromagnetic radiation, and said readily autoxidizable organic material containing at least one carbon-hydrogen bond which is activated with respect to hydrogenatom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic phosphite or phosphine compound.

21. The composition of claim 20 wherein said organic phosphorus compound is selected from the group consisting of tribenzyl phosphite; dibenzyl phosphite; trilauryl phosphite; trilauryl phosphine; triphenyl phosphine; and tribenzyl phosphine.

22. The composition of claim 20 wherein said plastic composition comprises about 70 to 99 percent by weight of said polymer, about 0.01 to 10 percent by weight of said transition-metal derivative and about 1 to 25 percent by weight of said readily autoxidizable organic material.

23. The composition of claim 20 wherein the transition-metal is selected from one or more of the elements 21 through 30, 39 through 48, 57 through 80 and 89 through 103 of the Periodic Table.

24. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an acetal compound selected from the group consisting of α-amyl cinnamaldehyde dimethyl acetal; citral dimetnyl acetal; hydratropic aldehyde dimethyl acetal; and phenylacetaldehyde diethyl acetal.

25. The process of claim 24 wherein about 0.01 to about 10 percent by weight of the transition-metal derivative and about 1 percent to about 25 percent by weight of the readily autoxidizable organic material are dispersed in about 70 to 99 percent by weight of said polymer.

26. The process of claim 24 wherein the transition metal is selected from one or more of the elements 21 through 30, 39 through 48, 57 through 80, and 89 through 103 of the Periodic Table.

27. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an amine compound.

28. The process of claim 27 wherein said amine compound is selected from the group consisting of benzyldimethyl amine; N,N-dibenzylaniline; n-decylamine; 4,4'-methylenebis(N,N-dimethylaniline); oleylamine; linoleylamine; and spermine.

29. The process of claim 27 wherein about 0.01 to about 10 percent by weight of the transition-metal derivative and about 1 percent to about 25 percent by weight of the readily autoxidizable organic material are dispersed in about 70 to 99 percent by weight of said polymer.

30. The process of claim 27 wherein the transition metal is selected from one or more of the elements 21 through 30, 39 through 48, 57 through 80, and 89 through 103 of the Periodic Table.

31. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an aldehyde compound.

32. The process of claim 31 wherein said aldehyde compound selected from the group consisting of heliotropin; 3-benzyloxybenzaldehyde; 4-benzyloxybenzaldehyde; p-n-octyloxybenzaldehyde; decanal; 10-undecenal; dodecanal; 2-methylundecanal; n-tetradecanal; α-amylcinnamaldehyde; cinnamaldehyde; citral; citronellal; p-isopropylbenzaldehyde; p-isopropyl-alpha-methylhydrocinnamaldehyde; α-n-hexylcinnamaldehyde; and salicyladehyde.

33. The process of claim 31 wherein about 0.01 to about 10 percent by weight of the transition-metal derivative and about 1 percent to about 25 percent by weight of the readily autoxidizable organic material are dispersed in about 70 to 99 percent by weight of said polymer.

34. The process of claim 31 wherein the transition metal is selected from one or more of the elements 21 through 30, 39 through 48, 57 through 80, and 89 through 103 of the Periodic Table.

35. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic sulfur compound.

36. The process of claim 35 wherein said organic sulfur compound is selected from the group consisting of benzyl mercaptain; 1-dodecanethiol; 2-mercaptobenzimidazole; 1-decanethiol; benzenethiol; p-toluenethiol; 1-octadecanethiol; p-methoxybenzenethiol; 2-mercaptobenzothiazole; dibenzyl sulfide; dibenzyl disulfide; dilauryl sulfide; dilauryl disulfide; benzenesulfinic acid; and p-toluenesulfinic acid.

37. The process of claim 35 wherein about 0.01 to about 10 percent by weight of the transition-metal derivative and about 1 percent to about 25 percent by weight of the readily autoxidizable organic material are dispersed in about 70 to 99 percent by weight of said polymer.

38. The process of claim 35 wherein the transition metal is selected from one or more of the elements 21 through 30, 39 through 48, 57 through 80, and 89 through 103 of the Periodic Table.

39. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic borane compound.

40. The process of claim 39 wherein said organic boron compound is selected from the group consisting of tri-n-hexylborane; tri-n-octylborane; and triisobutylborane.

41. The process of claim 39 wherein about 0.01 to about 10 percent by weight of the transition-metal derivative and about 1 percent to about 25 percent by weight of the readily autoxidizable organic material are dispersed in about 70 to 99 percent by weight of said polymer.

42. The process of claim 39 wherein the transition metal is selected from one or more of the elements 21 through 30, 39 through 48, 57 through 80, and 89 through 103 of the Periodic Table.

43. A process for preparing a plastic composition which is degradable in the absence of electromagnetic radiation, which process comprises dispersing into an organic polymer at least one transition metal derivative and at least one readily autoxidizable organic material, said readily autoxidizable organic material containing at least one carbon-hydrogen bond which is activated with respect to hydrogen-atom abstraction by an adjacent multiply bonded atom or an adjacent heteroatom and being a material which reacts with gaseous oxygen at a reaction rate more rapid than the corresponding reaction, under comparable conditions, of gaseous oxygen with an equal weight of said polymer in the absence of said readily autoxidizable material and being an organic phosphite or phosphine compound.

44. The process of claim 43 wherein said organic phosphorus compound is selected from the group consisting of tribenzyl phosphite; dibenzyl phosphite; trilauryl phosphite; trilauryl phosphine; triphenyl phosphine; and tribenzyl phosphine.

45. The process of claim 43 wherein about 0.01 to about 10 percent by weight of the transition-metal derivative and about 1 percent to about 25 percent by weight of the readily autoxidizable organic material are dispersed in about 70 to 99 percent by weight of said polymer.

46. The process of claim 43 wherein the transition metal is selected from one or more of the elements 21 through 30, 39 through 48, 57 through 80, and 89 through 103 of the Periodic Table.

* * * * *